United States Patent [19]

Valchev et al.

[11] Patent Number: 4,783,790

[45] Date of Patent: Nov. 8, 1988

[54] DIRECT-CURRENT ARC FURNACE FOR STEELMAKING

[75] Inventors: Alexander Y. Valchev; Rumen B. Radev; German I. Germanov, all of Sofia, Bulgaria

[73] Assignee: NPP PO Elektrotermia, Sofia, Bulgaria

[21] Appl. No.: 8,794

[22] Filed: Jan. 30, 1987

[30] Foreign Application Priority Data

Jan. 30, 1986 [BG] Bulgaria .................................. 73325

[51] Int. Cl.$^4$ ............................................. H05B 7/12
[52] U.S. Cl. .................................................... 373/108
[58] Field of Search ......................... 373/72, 108, 76

[56] References Cited

U.S. PATENT DOCUMENTS 3,835,230  9/1974  Valchev et al. ..................... 373/108

Primary Examiner—Roy N. Envall, Jr.
Attorney, Agent, or Firm—Klein & Vibber

[57] ABSTRACT

A DC arc furnace for steelmaking in which horizontal steel anodes without internal water cooling are used. The front portion of the anodes enters through holes in the walls into the furnace space and the lower level of the anodes reaches the furnace space in a level which is lower than the door threshold. The rear portion of the anodes is disposed in horizontal ducts outside the furnace hood, these ducts being lined with refractory material. The horizontal components of the anodes are connected to vertical steel components for current supply. The cooling of the horizontal and the vertical components is effected outside the furnace hood by means of components for indirect water cooling, these components being arranged in levels higher than the door threshold.

7 Claims, 3 Drawing Sheets

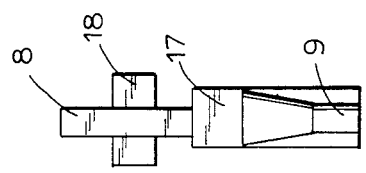
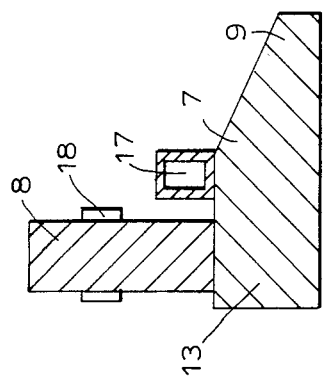

DIRECT-CURRENT ARC FURNACE FOR STEELMAKING

BACKGROUND OF THE INVENTION

This invention relates to a direct-current arc furnace for steelmaking.

By the end of the 19th century it was known that the direct-current arc has substantial advantages as a local source of heat, as compared to the alternating-current arc. However, for a long time, there did not exist reliable and advantageous current rectifiers for the heavy-duty electric conditions of operation of arc furnaces. With the development of high-power diodes and thyristors during the 1960's, direct-current arc furnaces became topical again.

The main problem of the direct-current furnaces is the leading of the positive pole of the DC source to the molten steel. Prior to the 1960's, aproposed solution to this problem described bottom anodes on the basis of some hypothetic refractory, which is electrically non-conductive at normal temperature and achieves a sufficient electric conductivity at high temperature. See, e.g., British Pat. No. 118357 (1917). Such anodes have obviously not found any application, since such a refractory material does not exist.

Another proposed solution suggested movable water-cooled metal anodes which enter the furnace through holes in the walls, these holes being located higher than the door threshold. German Pat. DE No. 2340674. A drawback of such electrodes, however, is that metal and slag deposits in the wall holes block their motion and they become immovable, this resulting in a comparatively fast erosion.

Yet another proposed solution to the problem suggested cooled bottom metal anodes. Some designs describe a furnace bottom in which there are arranged a multitude of steel rods, the external bottom ends of which are cooled by air under forced circulation. See, 10th International Congress Electrothermy, Stockholm, 1984, Paper K-4. Recently, there has also been described a case where the anodes represent steel blocks built-in the furnace bottom, their bottom external ends being intensively water-cooled. See, 2nd Europ. Congress Electric Furnaces, Florence, 1986, Paper R-4.7. Such solutions are featured by the presence of a transient melting zone between the molten steel and the non-molten steel anodes. A drawback of such solutions is the arrangement of the anodes in the furnace bottom, this being a very vulnerable place. The deposition of the anodes in the area below the door or underneath the furnace spout does not provide advantages and only complicates the design. Such solutions are inevitably related to a sharply reduced {life} of the respective bottom components of the furnace.

There has been described a current supply by means of magnesite-carbon bricks, built-in the bottom portion of the furnace wall. See, 2nd Europ. Congress Electric Furnaces, Florence, 1986, Paper R-4.8. There has also been described the building-up of the furnace bottom with magnesite-carbon bricks. See, British Pat. No. 1504443. A drawback of such solutions is that, in similar conditions of operation, the magnesite-carbon bricks have a shorter life and do not ensure, in the beginning of the melts, the necessary electric conductance.

It is therefore a general object of this invention to develop a steelmaking arc furnace for operation with direct current, which utilizes the advantages of the DC arc and provides a good and reliable electric connection between the steel anodes and the molten steel.

SUMMARY OF THE INVENTION

According to this invention, the above-described object is achieved by using horizontal steel anodes without internal water cooling. Their front part enters through holes in the walls into the furnace and the lower level of the anodes reaches the furnace space in a level which is lower than the door threshold. The rear part of the anodes is disposed in horizontal ducts outside the furnace hood, these ducts being lined with refractory material. The horizontal components of the anodes are connected to vertical steel components for current supply. The cooling of the horizontal and the vertical components is effected outside the furnace hood by means of components for indirect water cooling, these components being arranged in levels higher than the door threshold.

BRIEF DESCRIPTION OF THE DRAWING

For a better understanding of the invention, reference should be made to the accompanying drawing illustrating a preferred embodiment of the invention, wherein:

FIGS. 3, 3a, and 3b show a steel anode with water-cooled components in three projections.

DESCRIPTION OF THE PREFERRED EMBODIMENT

Figure 1:
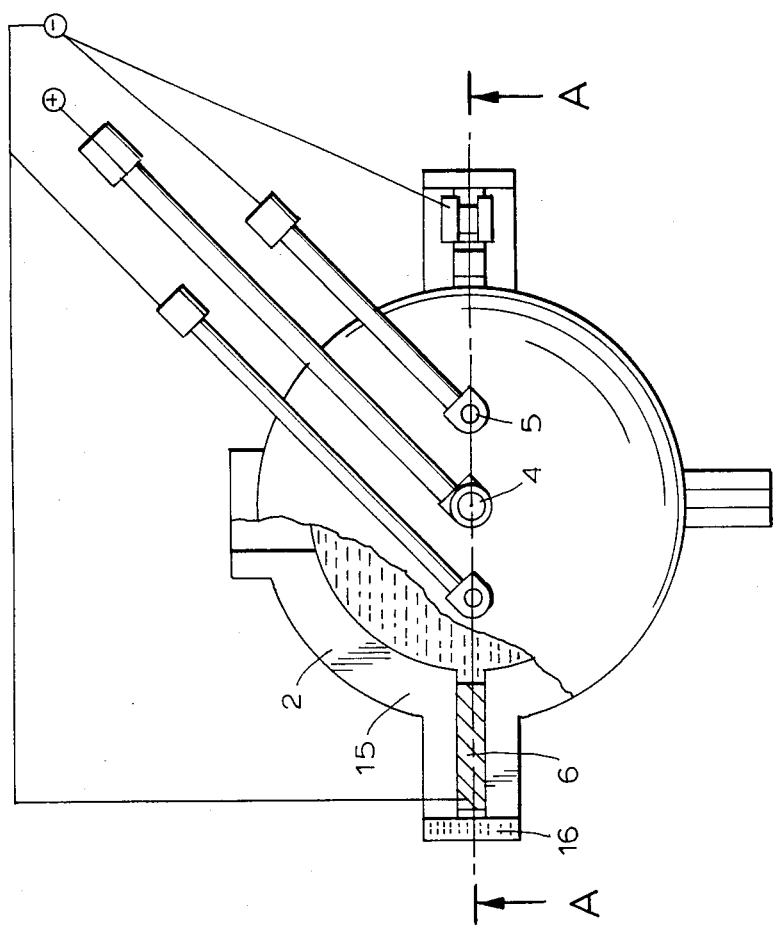
FIG. 1 is a vertical view of a DC furnace with partial sectional view of the level of the molten metal.
Figure 2:
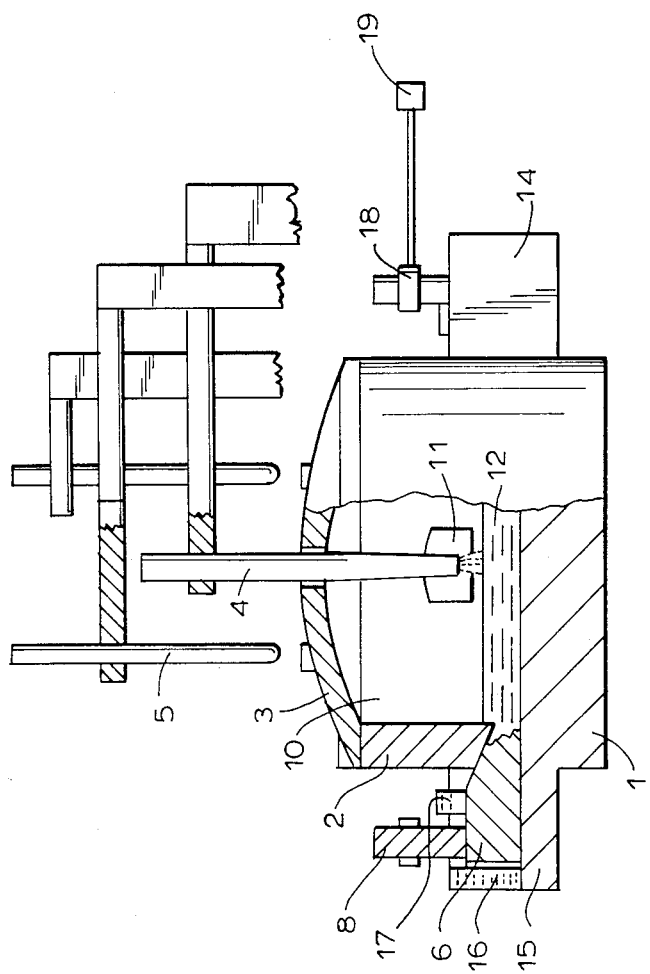
FIG. 2 is a partial sectional view along A—A in FIG. 1.

Referring to FIGS. 1 and 2, the DC arc furnace comprises a bottom 1, walls 2, a roof 3, a graphite cathode 4 and melting graphite anodes 5, similar to those disclosed in U.S. Pat. No. 3,835,230, the disclosure of which patent is hereby incorporated herein by reference. Because of design considerations, as seen in FIG. 1, the axes of the three electrode holders are displaced at 45 degrees with respect to the transverse axis (A—A) of the furnace.

Turning to FIGS. 2 and 3, the steel anodes 6 have both a horizontal component 7 and a vertical component 8. The horizontal component 7 is a compact steel body without internal water cooling. The front (or internal) portion 9 of this component 7 enters through holes in the wall 2 into the furnace space 10, its bottom level being at a height lower than the door threshold 11. This internal portion 9 of horizontal component 7 of steel anodes 6 effects a direct electric contact with the molten steel 12. The rear portion 13 of horizontal component 7 of steel anodes 6 is outside the furnace hood and it is disposed in a side duct 14, which is lined with refractory material 15 and water-cooled components 16. The top level of the rear portion 13 of the horizontal component 7 of the steel anodes 6 is at a height higher than the door threshold 11, and on its top surface there are provided components for indirect water cooling 17.

The vertical component 8 of the anodes 6 represents a compact steel body without water cooling. The bottom portion of the vertical component 8 is in direct electric contact with the rear portion 13 of the horizontal component 7. A little higher, the vertical component 8 is attached in the electrode under holder 18 to the electric connection with the positive pole of the DC source. The electrode holder 18 is provided with components for direct water cooling. It is provided, moreover, with a mechanism 19 for motion in vertical direction.

As an exception it may become, if necessary, imperative to consume a given length of the vertical component 8. In such cases, after the necessary motion downwards, the electrode holder 18 releases the vertical component 8 and clamps it in a higher place.

It is a specific feature of the invention that the water-cooled component 16 of the duct 14 is not directly included in the current circuit, thus avoiding the occurence of electric erosion on its surface. During the assembly there is left an air gap between the rear portion 13 of the horizontal component 7 and the water-cooled component 16. Because of temperature variations of the steel anode 6 and the refractory 15, there may be formed small cracks and this air gap will be filled with steel. This does not affect the steel anode since, according to the law of current distribution, only an insignificant portion of the current at minimum potential drop can flow through the water-cooled component 16.

The horizontal steel component 7 has a great temperature drop along its length—when the steel is melted, the front portion 9 is heated up to 1450 to 1500 degrees Celsius and the rear portion 13 is heated up to 200-300 degrees Celsius. The front portion 9 is molten to such depth in the refractory lining of wall 2, to where the temperature drops below 1450 degrees Celsius. In pouring, the molten steel in the hole in the wall 2 flows out totally or partially and there appears a comparatively shallow cavity. During the preparation, the charging with scrap and the beginning of the melting, the temperature of the front portion 9 and the respective refractory has dropped considerably below 1450 degrees Celsius. For this reason, the first portions of molten steel (small streams and splashes) solidify immediately and fill the cavity. In heating and overheating the molten steel, the temporarily solidified steel in the hole is molten, it flows out during the next-following melt and so on—the cycle is repeated in each melt.

FIG. 1 shows that both graphite melting anodes 5 and the steel anodes 6 are arranged along the transverse axis of the furnace, i.e. the angle between them with centre the graphite cathode 4 is 180 degrees. Because of service considerations, it is possible to vary this angle within the limits ±20 degrees. From a technological point of view, the angle between the transverse axis of the furnace and the axis of the steel anodes 6 with centre of the angle the internal end of the hole in wall 2 of the furnace is more important. This angle can also be varied within the limits ±20 degrees.

The steelmaking in the DC furnace is effected in a way similar to that described in U.S. Pat. No. 3,835,230, the disclosure of which patent is hereby incorporated herein by reference. The furnace is charged with scrap and the graphite melting anodes 5 are lowered until they are pressed against the scrap. Then follows a lowering of the graphite cathode 4 and when it touches the scrap the electric arc is ignited. During the process of melting, the scrap underneath the melting graphite anodes 5 settles gradually down, but by means of a suitable automatic system there is maintained a constant pressure of the melting anodes 5 against the scrap. During the process of melting, the level of molten steel 12 rises and comes in electric contact with the front portion 9 of the steel anode 6. When the current amperage in the circuit of the steel anodes reaches 50% of the preset value, the melting graphite anodes 5 are lifted over the roof 3 and the electrode holes are covered in a suitable way.

Usually the scrap is charged one more time or several more times. This does not change the character of current supply to the molten steel 12, since the electric connection to the steel anodes 6 is already effected.

In current technological practice of electric furnaces, it is possible as exception that no electric contact is achieved between the molten steel 12 and a given steel anode 6. In such case it is possible to proceed in several ways. As a first measure it is tried to melt the refractory in the internal end of the hole in wall 2 by means of an electric arc. For this purpose, still half-way of the process of melting, there is proceeded to operate with anode arcs, i.e. the catnode is immersed in the molten slag (not in the metal) and two open arcs begin to act on the melting graphic anodes 5. Because of electromagnetic reasons, these arcs are directed towards the furnace walls—this in immediate closeness.

If the aforedescribed technique does not restore the electric circuit molten steel 12—steel anodes 6, then the melt is conducted in "electric resistance" conditions according to U.S. Pat. No. 4,110,547, the disclosure of which patent is hereby incorporated herein by reference.

Further, because of production reasons, there is a choice of two possibilities: either to continue to proceed work on a preset number of melts in "electric resistance" conditions or, after a given melt, to burn through the hole in wall 2; it is obvious that in this case the horizontal component 7 of the steel anode 6 is totally destroyed and must be replaced by a new one. The burning-through can be effected by application of the widely used technique for burning through poking holes in ferro-alloy and carbide furnaces with electric arc or by a technique applied in non-ferrous and ferrous metallurgy for burning through poking holes with oxygen. After the burning through of a sufficiently wide hole to the furnace space 10, the remaining steps are of routine type.

Only a surface with one graphite cathode and two graphite and two steel anodes has been described so far as an example. By observing the exposed basic situations, there can be used furnaces with three carbon cathodes arranged in a triangle, similar to the three-phase AC furnaces, as well as furnaces with two or more carbon cathodes arranged in a line, similar to some ore thermal furnaces.

The present invention is featured by the following advantages:

The position of the phase boundary between the molten steel and the solid steel anodes during each melt varies cyclically.

The lead of the positive pole of the DC sources is located laterally outside the furnace hood with the ability for easy maintenance.

The steel anodes are disposed in external ducts with refractory lining; this excludes any possiblity of the occurence of a breakthrough of molten steel through time.

The indirect cooling of the steel anodes is effected with water-cooled components disposed outside the furnace hood in a level higher than the door threshold; because of this there cannot occur any mixing of cooling water with molten steel.

The water-cooled components in the duct walls are not included in the main current circuit; therefore their surface cannot be subjected to electric erosion.

An eventual interruption of the electric connection molten steel—steel anodes can be easily restored.

Although the invention is illustrated and described with reference to a preferred embodiment thereof, it is to be expressly understood that it is in no way limited to the disclosure of such preferred embodiment, but is capable of numerous modifications within the scope of the appended claims.

We claim:

1. A DC arc furnace for steelmaking comprising
   an enclosed furnace space defined by walls and accessible by a door;
   two horizontal steel anodes, each of said anodes having a front and rear portion, the front portion of said anodes entering the furnace space through holes in said walls, the lower level of said horizontal anodes being below the level of the door threshold;
   two horizontal ducts located outside the furnace space, each of said ducts corresponding to one of said anodes, the rear portion of each of said anodes being disposed in the corresponding duct;
   said horizontal ducts being lined with refractory material and provided with means for water cooling;
   said rear portion being provided with components for indirect water cooling, disposed outside the furnace in a level higher than the door threshold.

2. A DC arc furnace for steelmaking as claimed in claim 1 further comprising
   each of said anodes further comprising a vertical component representing a compact steel body without internal water cooling, the bottom portion of the vertical component being in direct electrical contact with said rear portion.

3. A DC arc furnace for steelmaking as claimed in claim 2 further comprising
   the top portion of the vertical component being attached in an electrode holder with components for water cooling and with a mechanism for motion in vertical direction.

4. In a DC arc furnace for steelmaking, having a furnace space defined by a bottom, a wall, and a roof, and accessible by a door and a spout; and electrode holders with one or more movable graphite anodes and one or more movable graphite cathodes, passing through holes in the roof; and one or more anodes of different composition and design for leading the positive pole of a DC source to scrap and to molten steel, the improvement comprising:
   said anodes of different composition being two lateral steel anodes, each anode comprising a horizontal component representing a compact steel body without internal water cooling,
   said horizontal component having a front portion which enters through a hole in the wall into the furnace space,
   the bottom level of said front protion being disposed at a height lower than the door threshold and being in direct electric contact with the molten steel;
   said horizontal component also having a rear portion which is outside the furnace and disposed in a lateral duct;
   said lateral duct being lined with refractory material and water-cooled components;
   said rear portion being provided with components for indirect water cooling, disposed outside the furnace in a level higher than the door threshold;
   each of said anodes further comprising a vertical component representing a compact steel body without internal water cooling, the bottom portion of the vertical component being in direct electric contact with the rear portion of the horizontal component, and the top portion of the vertical component being attached in an electrode holder with components for water cooling and with a mechanism for motion in vertical direction.

5. A DC arc furnace as claimed in claim 4, wherein the cross-section of the front portion of the horizontal component of the anodes in the furnace wall is increased from the inside to the outside.

6. A DC arc furnace as claimed in claim 4, wherein the water-cooled components are located in the walls of the lateral duct and are mounted at a preset distance from the horizontal and the vertical components of the anodes.

7. A DC arc furnace as claimed in claim 4, wherein the holes for the steel anodes in wall are located in the transverse axis of the furnace one opposite to the other, and the axes of the anodes and the axes of the ducts are within an angle of 20 degrees with respect to the transverse axis in direction to the spout or to the furnace door.

* * * * *